R. D. Haines.
Glass Molds.
No. 91,118.   Patented Jun. 8, 1869.
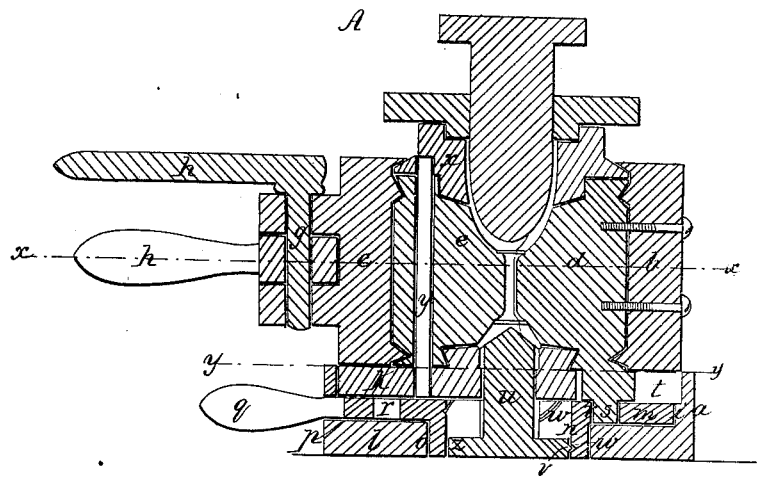
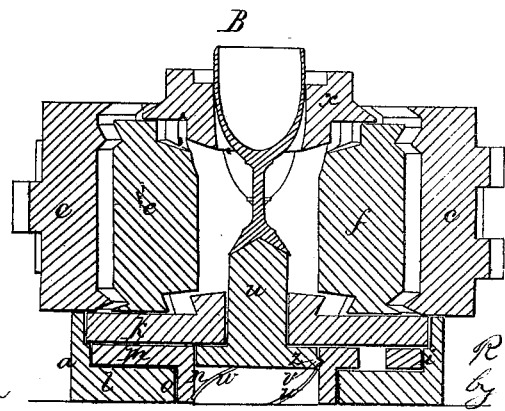
Witnesses
S. B. Kidder
M. W. Frothingham
Inventor
R. D. Haines
by his Attys
Crosby Halsted & Gould

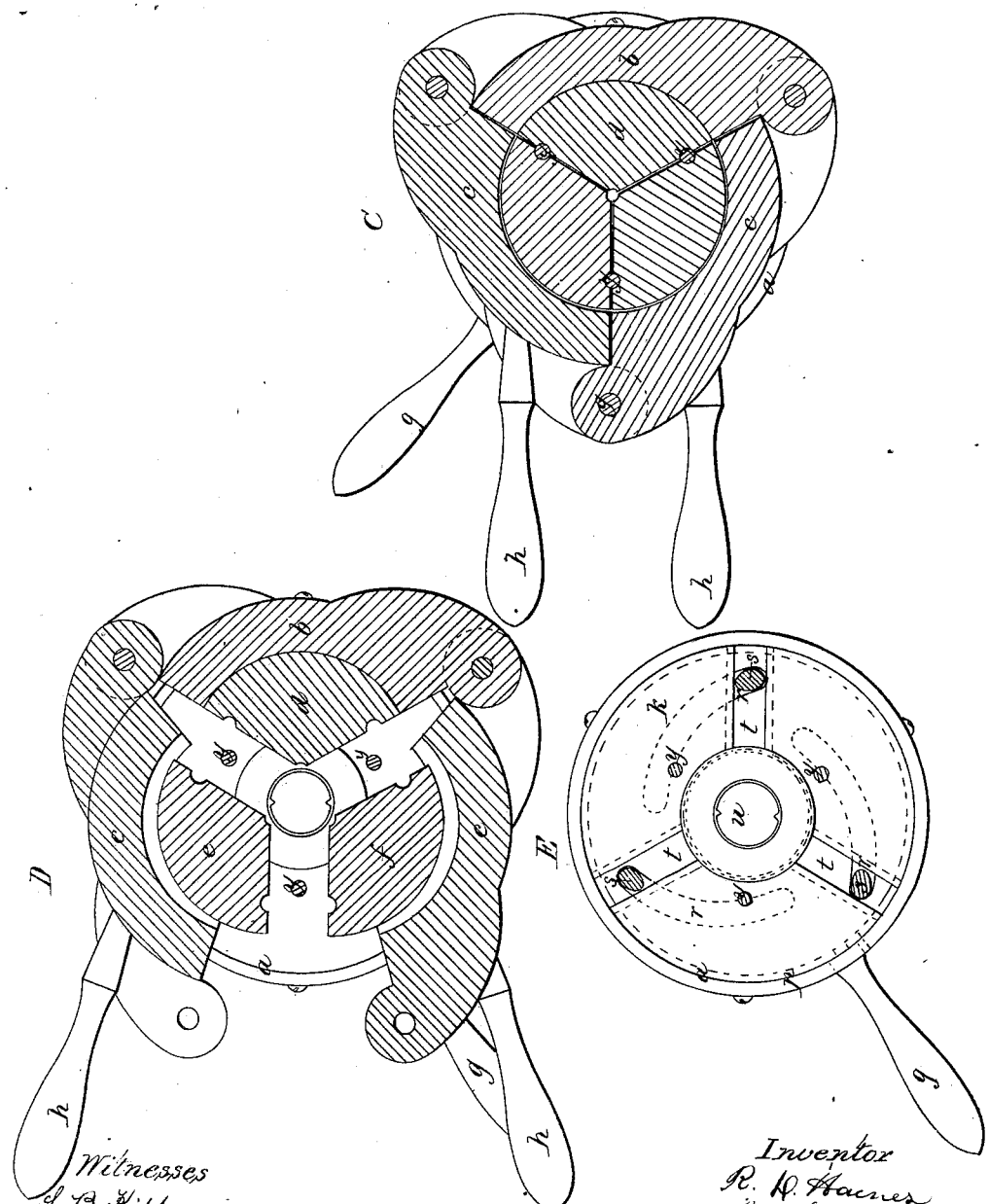

United States Patent Office.

ROBERT D. HAINES, OF CAMBRIDGE, ASSIGNOR TO THE "BOSTON SILVER-GLASS COMPANY," OF BOSTON, MASSACHUSETTS.

*Letters Patent No. 91,118, dated June 8, 1869.*

IMPROVED SECTIONAL MOULD FOR GLASS-WARE.

The Schedule referred to in these Letters Patent and making part of the same.

*To all whom it may concern:*

Be it known that I, ROBERT D. HAINES, of Cambridge, in the county of Middlesex, and State of Massachusetts, have invented an Improved Sectional Mould for Glass-Ware; and I do hereby declare that the following, taken in connection with the drawings which accompany and form part of this specification, is a description of my invention sufficient to enable those skilled in the art to practise it.

My present invention relates to the organization of glass-moulds of that class in which the mould (for forming goblets and similar articles) is composed, or partly composed, of movable hinged jaws, the conjoined inner surfaces of which, when the jaws are brought together, correspond to the contour or outer form to be given to the article to be made in the mould, (the molten or plastic glass being pressed against the die-surfaces by the action of the plunger, or male die,) the article, when pressed, being freed, or being brought into position for removal, by taking off the cap-ring and separating the jaws.

An example of such a mould may be seen by reference to my United States patent, No. 64,312.

In these moulds, however, considerable difficulty is experienced in detaching the moulded article in perfect shape and without breakage, especially when the article is much figured, or has deep projections or depressions, for the reason that the different parts of the die-surfaces of the jaws, more or less remote from the hinge which connects the jaws, draw away from the glass (as the jaws open) more or less gradually, according to their positions relatively to the hinge, and by reason of the article being somewhat inaccessible when the jaws are opened.

My improvements have particular reference to such construction and arrangement and connection of the parts as shall obviate these difficulties, and the invention consists in combining, with the hinged clamping-jaws, a series of sliding mould-blocks, all of which diverge from the axis of the mould in radial directions, (after the clamping-jaws are opened,) while, when closed together, they form the sides of the matrix, they being held in place by the jaws when the jaws are closed.

The invention also consists in the combination, with a mould having hinged or sliding die-jaws, of a vertical pin, (upon the top of which the recessed bottom of the article is formed), made to rise and lift the article when the mould-jaws or sections open or diverge.

The drawings represent a mould embodying my improvements.

A shows a vertical central section through the bolt which locks the jaws together, the jaws being closed.

B is a vertical and central cross-section, the jaws being open.

C is a horizontal section on the line $x\,x$, the jaws being closed.

D is a similar section, the jaws being open.

E is a horizontal section on the line $y\,y$.

$a$ denotes the base of the mould, upon one side of which is mounted a sliding hinge-block, $b$, to which are jointed the two clamping-jaws $c\,c$.

Fastened to the inner surface of the hinge-block $b$, is a segmental mould or die-block, $d$, the inner surface of which forms a section of the matrix, or moulding-surface of the die.

On each side of this plate $d$, is a similar die-block, $e$, or $f$, which slides upon the plate $a$.

The adjacent sides of the three blocks $d$, $e$, $f$, but together when the blocks are slid inward, as seen at C, and when they are spread apart, each moves in a radial direction, and assumes the position seen at D, the die-blocks $e\,f$, and hinge-block $b$, each sliding radially from the axis of the mould when they separate.

The two clamping-jaws $c\,c$ are fastened together at their front ends (when closed) by a bolt-pin $g$, and each has projecting from it a handle, $h$, by grasping which the jaws are opened or closed.

The base, $a$, is made with a space, $i$, between its upper and lower plates, $k\,l$, and in this space is a cam-wheel, or disk, $m$, a hub, $n$, projecting from the centre of which, fits and turns in a bearing, $o$, in the plate $l$. At the front of the base is a slot, $p$, through which projects a handle, $q$, fastened to the cam-wheel, the wheel being reciprocated by means of this handle. In the wheel are three eccentric or cam slots, or grooves, $r$, (as seen at E,) into each of which a pin, $s$, extends from the bottom of the mould-block over it.

After the article is pressed, the bolt-pin $g$ is withdrawn, and, by grasping the handles $h$, the jaws $c$ are spread open, the mould-blocks $d\,e\,f$ remaining closed. Then the cam-disk handle $q$, is swung around to the end of the slot $p$, as seen at E, and the action of the cam-slots $r$ throws the pins $s$ radially outward, each pin travelling in a radial slot, $t$, made through the upper base-plate $k$, thereby causing each mould-block to move radially out from the pressed article, releasing the article from contact of all parts of the side-moulding surfaces simultaneously.

The bottom surface of the moulded article is formed by the top of a plunger or pin, $u$, as seen at A and B. This pin is arranged to slide vertically, for which purpose it passes through the base-plate $k$, as seen at A and B, and works up and down in the centre of the cam-plate, or disk $m$, the bottom of the pin preferably having a flange, $z$, on the periphery of which are teeth or projections, $v$, which enter nut-threads $w$, in the inner side of the hub $n$ of the cam-disk $m$, as seen at A and B.

Now when the mould is closed, the top of the pin $u$ forms the bottom of the mould, as seen at A. But as the mould-blocks are separated by the rotation of the cam-disk, such rotation of the disk also forces up the pin, and the moulded article standing thereupon, as seen at B, such upward movement being caused by the action of the rotating spiral grooves or screw-threads $w$, upon the teeth $v$.

This elevation of the article brings it into position where it can readily be removed by the "gatherer," and without the necessity of displacing the cap-ring $x$, which, in all other hinged or sectional moulds, has to be removed to obtain access to the moulded article. I bolt or pin this cap-ring to the base, by a series of bolts or pins, $y$, passing between the blocks or sections of the mould, as seen at A C D.

With a mould having this construction, I am enabled to produce, to great advantage, goblets and similar articles, of much finer quality, or greater degree of finish as to surface, configuration, or ornamentation, and of much thinner, or more slender forms, than with hinged or sectional moulds, as heretofore constructed.

It will be obvious that a greater number of radially-sliding mould-blocks may be used, they being moved outward from the article, or into position to form the mould, as shown, or by any equivalent means, and other mechanism may be employed for sliding the three mould-blocks $d\ e\ f$, and for raising and depressing the pin $u$; but I prefer the arrangement substantially as shown.

When the handle $q$ is moved in the opposite direction to that described, the cam-slots will bring the mould-blocks together, and the screw-thread will carry down the pin $u$, thus preparing the mould for the formation of another goblet.

1. I claim, in combination with the hinged, or clamping-jaws, the sliding mould-blocks, diverging radially from the axis of the mould, substantially as described.

2. I also claim, in combination with the hinged jaws, and the sectional sliding mould-blocks, the vertically sliding pin $u$, substantially as described.

3. Also, in combination with means for raising the pressed article, the stationary cap-ring $x$, substantially as described.

ROBERT D. HAINES.

Witnesses:
   J. B. CROSBY,
   FRANCIS GOULD.